US012563608B2

(12) United States Patent
Lee et al.

(10) Patent No.: US 12,563,608 B2
(45) Date of Patent: Feb. 24, 2026

(54) SOFT BUFFER FLUSHING BASED ON MAC RESET FOR RRC CONNECTION BETWEEN WIRELESS DEVICES

(71) Applicant: LG ELECTRONICS INC., Seoul (KR)

(72) Inventors: Youngdae Lee, Seoul (KR); Giwon Park, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 605 days.

(21) Appl. No.: 17/799,643

(22) PCT Filed: Apr. 9, 2021

(86) PCT No.: PCT/KR2021/004471
§ 371 (c)(1),
(2) Date: Aug. 12, 2022

(87) PCT Pub. No.: WO2021/206494
PCT Pub. Date: Oct. 14, 2021

(65) Prior Publication Data
US 2023/0081644 A1 Mar. 16, 2023

(30) Foreign Application Priority Data

Apr. 9, 2020 (KR) ........................ 10-2020-0043619

(51) Int. Cl.
*H04W 76/10* (2018.01)
*H04W 24/08* (2009.01)
(Continued)

(52) U.S. Cl.
CPC .......... *H04W 76/10* (2018.02); *H04W 76/14* (2018.02); *H04W 76/20* (2018.02); *H04W 76/23* (2018.02);
(Continued)

(58) Field of Classification Search
CPC ..... H04W 76/10; H04W 76/34; H04W 76/23; H04W 76/14; H04W 76/30; H04W 76/20;
(Continued)

(56) References Cited

U.S. PATENT DOCUMENTS

2019/0045507 A1* 2/2019 Sorrentino ........ H04W 72/1268
2021/0021974 A1* 1/2021 Kim ........................ H04W 4/12
(Continued)

FOREIGN PATENT DOCUMENTS

WO WO-2019066558 A1 * 4/2019 ........... H04L 69/324
WO 2020033088 2/2020
(Continued)

OTHER PUBLICATIONS

Kung et al., U.S. Appl. No. 62/884,365 is priority document for U.S. Patent Publication 2021/0045178 (Year: 2019).*
(Continued)

*Primary Examiner* — Nicholas R Taylor
*Assistant Examiner* — Angela Widhalm De Rodriguez
(74) *Attorney, Agent, or Firm* — LEE, HONG, DEGERMAN, KANG & WAIMEY

(57) ABSTRACT

A method and apparatus for soft buffer flushing based on media access control (MAC) reset for radio resource control (RRC) connection between wireless devices is provided. A first wireless device operating in a wireless communication system receives, from a second wireless device, data for a transport block (TB) associated to one PC5-radio resource control (RRC) connection among one or more PC5-RRC connections. Based on a media access control (MAC) reset being requested for the one PC5-RRC connection by an upper layer of the first wireless device, the first wireless device flushes soft buffers of all sidelink processes for all TBs associated to the one PC5-RRC connection.

10 Claims, 11 Drawing Sheets

Establishing one or more PC5-RRC connections — S900

Receive data for a transport block (TB) associated to one PC5-RRC connection among the one or more PC5-RRC connections — S910

Based on a MAC reset being requested for one PC5-RRC connection among the one or more PC5-RRC connection by an upper layer of the wireless device, flush soft buffers of all sidelink processes for all TBs associated to the one PC5-RRC connection, wherein the all TBs includes the TB — S920

(51) Int. Cl.

| | |
|---|---|
| *H04W 76/14* | (2018.01) |
| *H04W 76/18* | (2018.01) |
| *H04W 76/20* | (2018.01) |
| *H04W 76/23* | (2018.01) |
| *H04W 76/27* | (2018.01) |
| *H04W 76/30* | (2018.01) |
| *H04W 76/34* | (2018.01) |
| *H04W 92/10* | (2009.01) |
| *H04W 92/18* | (2009.01) |

(52) U.S. Cl.
CPC ........... *H04W 76/27* (2018.02); *H04W 76/30* (2018.02); *H04W 76/34* (2018.02); *H04W 92/10* (2013.01); *H04W 24/08* (2013.01); *H04W 76/18* (2018.02); *H04W 92/18* (2013.01)

(58) Field of Classification Search
CPC ..... H04W 92/18; H04W 24/08; H04W 76/18; H04W 76/27; H04W 92/10
See application file for complete search history.

(56) References Cited

U.S. PATENT DOCUMENTS

| | | | | |
|---|---|---|---|---|
| 2021/0045178 A1* | 2/2021 | Kung | ................... | H04W 76/18 |
| 2021/0219268 A1* | 7/2021 | Li | ........................ | H04B 17/318 |

| | | | | |
|---|---|---|---|---|
| 2022/0006571 A1* | 1/2022 | Basu Mallick | ....... | H04L 5/0055 |
| 2022/0174774 A1* | 6/2022 | Tseng | ................ | H04W 72/1263 |
| 2022/0224454 A1* | 7/2022 | Yu | ......................... | H04W 72/20 |

FOREIGN PATENT DOCUMENTS

| | | | | |
|---|---|---|---|---|
| WO | 2020033089 | 2/2020 | | |
| WO | 2020064643 | 4/2020 | | |
| WO | WO-2020165410 A1 * | 8/2020 | ........... | H04W 72/20 |
| WO | WO-2020182045 A1 * | 9/2020 | ........... | H04W 92/18 |
| WO | WO-2021062854 A1 * | 4/2021 | ........... | H04W 72/20 |

OTHER PUBLICATIONS

Korean Intellectual Property Office Application No. 10-2022-7039023, Office Action dated Aug. 3, 2023, 5 pages.
Huawei et al., "Summary document of AI 6.4.2.1—RRC aspects," 3GPP TSG-RAN WG2 Meeting #109 electronic, R2-2002093, Feb.-Mar. 2020, 12 pages.
LG Electronics Inc., "Introduction of 5G V2X with NR Sidelink," 3GPP TSG-RAN WG2 Meeting #109-e, Online, R2-2002316, Mar. 2020, 36 pages.
3rd Generation Partnership Project (3GPP), "Technical Specification Group Radio Access Network; NR; NR and NG-RAN Overall Description; Stage 2 (Release 16)," Section 5.7 and 16.9 of 3GPP TS 38.300 V16.1.0, Mar. 2020, 133 pages.
PCT International Application No. PCT/KR2021/004471, International Search Report dated Jul. 8, 2021, 2 pages.

* cited by examiner

710

720

First Device

711 Transceiver

712 Processing Chip

713 Processor

714 Memory

715 Software Code

Second Device

Transceiver 721

Processing Chip 722

Processor 723

Memory 724

Software Code 725

FIG. 9

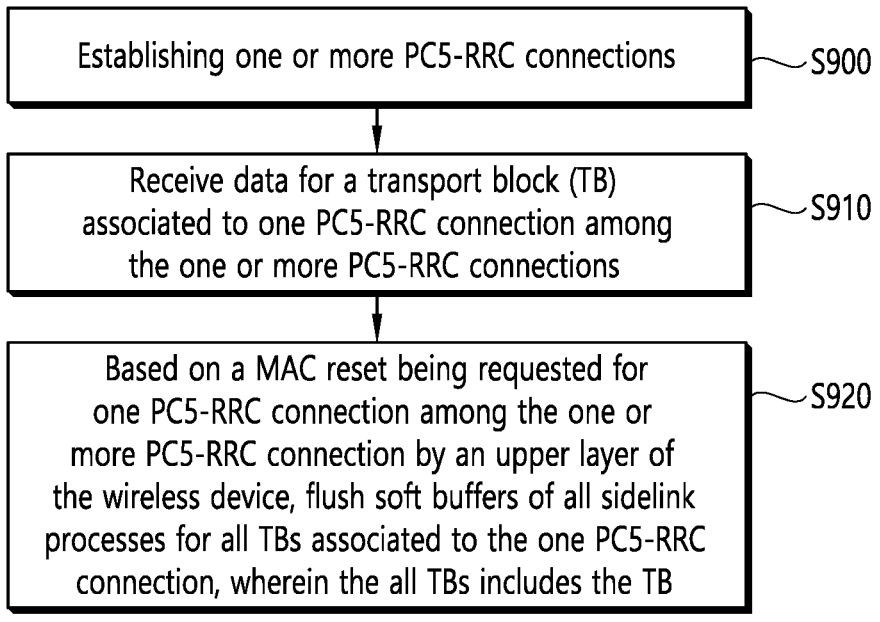

Establishing one or more PC5-RRC connections ～S900

Receive data for a transport block (TB) associated to one PC5-RRC connection among the one or more PC5-RRC connections ～S910

Based on a MAC reset being requested for one PC5-RRC connection among the one or more PC5-RRC connection by an upper layer of the wireless device, flush soft buffers of all sidelink processes for all TBs associated to the one PC5-RRC connection, wherein the all TBs includes the TB ～S920

FIG. 10

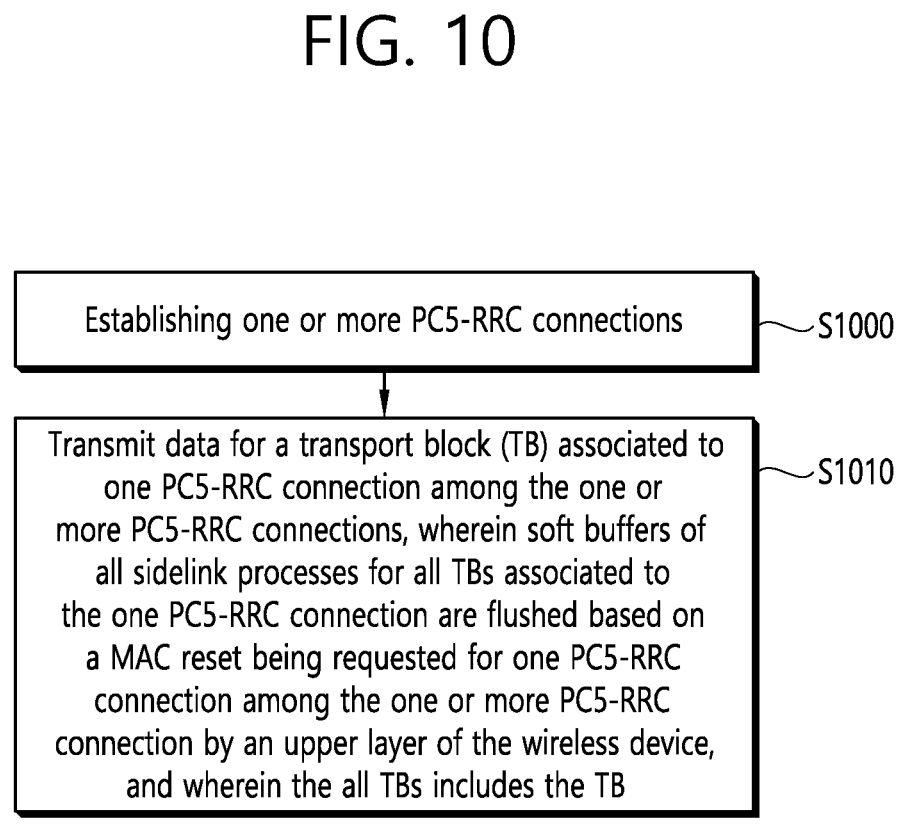

| Establishing one or more PC5-RRC connections |
| :---: |

~S1000

| Transmit data for a transport block (TB) associated to one PC5-RRC connection among the one or more PC5-RRC connections, wherein soft buffers of all sidelink processes for all TBs associated to the one PC5-RRC connection are flushed based on a MAC reset being requested for one PC5-RRC connection among the one or more PC5-RRC connection by an upper layer of the wireless device, and wherein the all TBs includes the TB |
| :---: |

~S1010

SOFT BUFFER FLUSHING BASED ON MAC RESET FOR RRC CONNECTION BETWEEN WIRELESS DEVICES

CROSS-REFERENCE TO RELATED APPLICATIONS

This application is the National Stage filing under 35 U.S.C. 371 of International Application No. PCT/KR2021/004471, filed on Apr. 9, 2021, which claims the benefit of earlier filing date and right of priority to Korean Application No. 10-2020-0043619 filed on Apr. 9, 2020, the contents of which are all incorporated by reference herein in their entirety.

TECHNICAL FIELD

The present disclosure relates to soft buffer flushing based on media access control (MAC) reset for radio resource control (RRC) connection between wireless devices.

BACKGROUND 5G new radio (NR) is a new radio access technology (RAT) developed by 3rd generation partnership project (3GPP) for the 5G (fifth generation) mobile network. It was designed to be the global standard for the air interface of 5G networks. The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible. Vehicle-to-everything (V2X) communication is the passing of information from a vehicle to any entity that may affect the vehicle, and vice versa. It is a vehicular communication system that incorporates other more specific types of communication as vehicle-to-infrastructure (V21), vehicle-to-network (V2N), vehicle-to-vehicle (V2V), vehicle-to-pedestrian (V2P), vehicle-to-device (V2D) and vehicle-to-grid (V2G).

SUMMARY

An aspect of the present disclosure is to provide a method and apparatus for flushing soft buffers upon releasing PC5-RRC connection between wireless devices. In an aspect, a method performed by a first wireless device operating in a wireless communication system is provided. The method includes receiving, from a second wireless device, data for a transport block (TB) associated to one PC5-radio resource control (RRC) connection among one or more PC5-RRC connections, and based on a media access control (MAC) reset being requested for the one PC5-RRC connection by an upper layer of the first wireless device, flushing soft buffers of all sidelink processes for all TBs associated to the one PC5-RRC connection.

In another aspect, a method performed by a second wireless device operating in a wireless communication system is provided. The method includes transmitting, to a first wireless device, data for a transport block (TB) associated to one PC5-RRC connection among one or more PC5-RRC connections, wherein soft buffers of all sidelink processes for all TBs associated to the one PC5-RRC connection are flushed based on a media access control (MAC) reset being requested for the one PC5-RRC connection by an upper layer of the first wireless device, and wherein the all TBs includes the TB.

In another aspect, apparatuses for implementing the above method are provided.

The present disclosure can have various advantageous effects.

For example, when MAC reset for a specific PC5-RRC connection occurs, maintaining soft buffers unnecessarily can be prevented so as to receive other sidelink transmissions.

For example, a UE performing SL transmission can properly reset MAC, in particular when UE detects link failure on Uu interface or PC5 interface.

For example, the system can properly handle MAC reset for a UE performing SL transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 9 shows an example of a method performed by a wireless device to which implementation of the present disclosure is applied.

FIG. 10 shows an example of a method performed by a second wireless device to which implementation of the present disclosure is applied.

DETAILED DESCRIPTION

Figure 1:
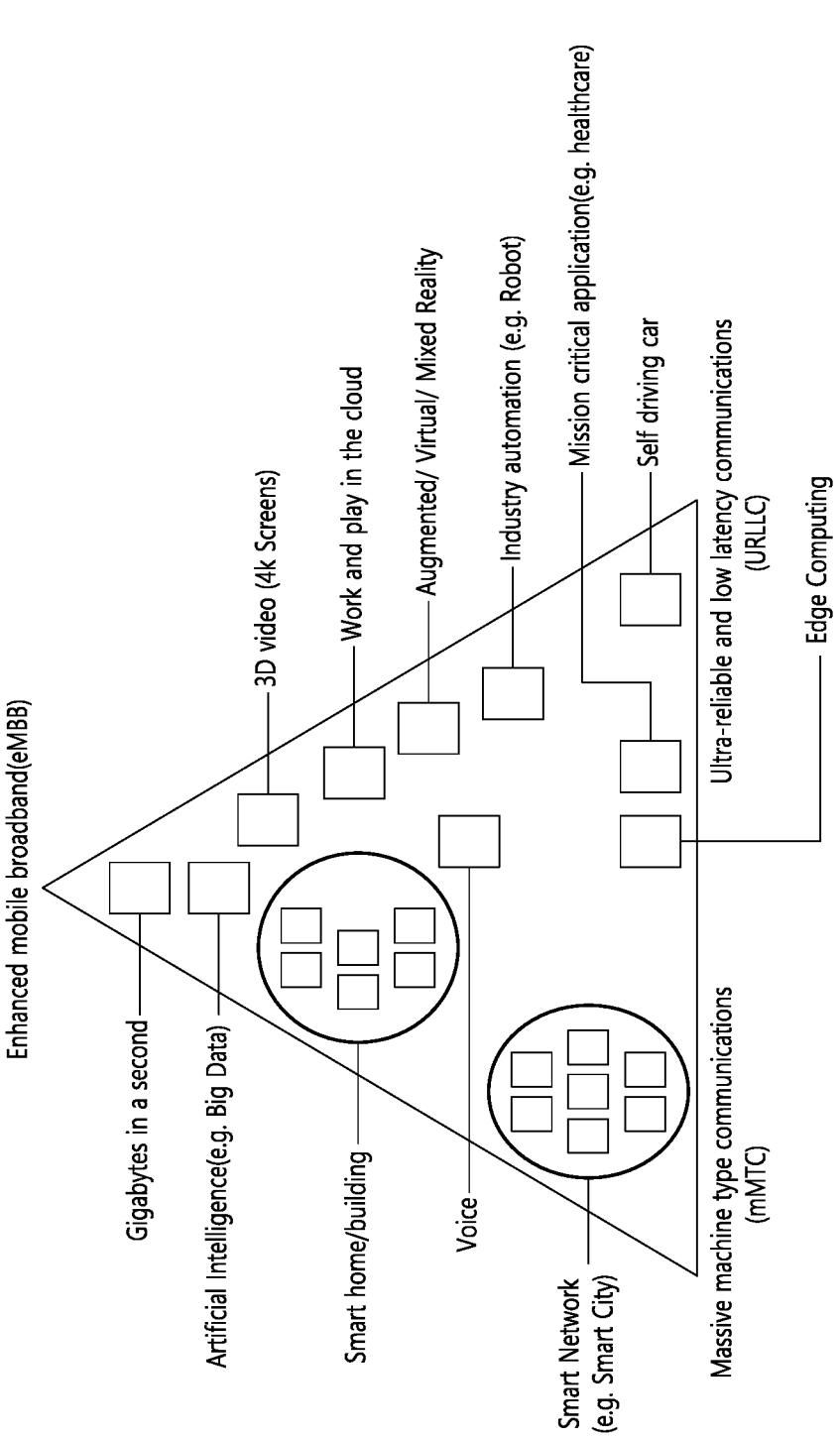
FIG. 1 shows examples of 5G usage scenarios to which the technical features of the present disclosure can be applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in downlink (DL) and SC-FDMA in uplink (UL). LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)" "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
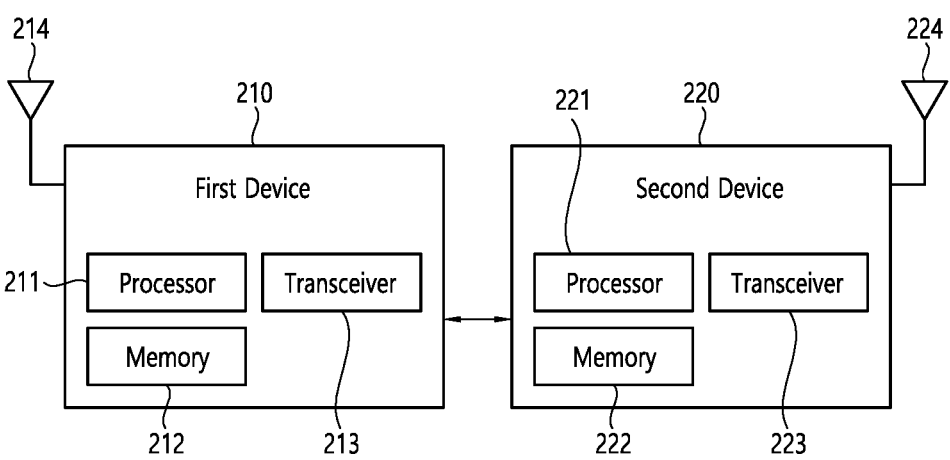
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
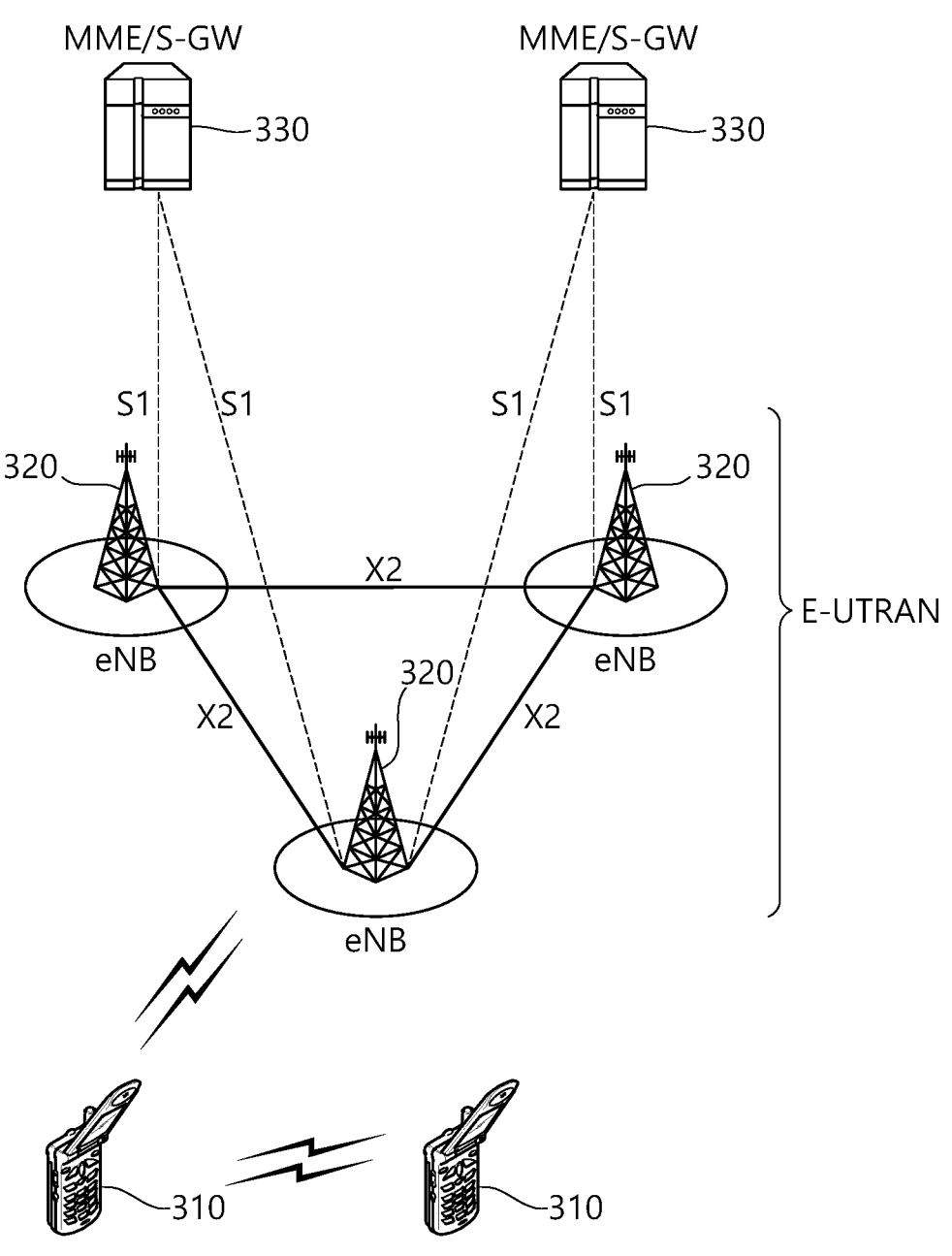
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
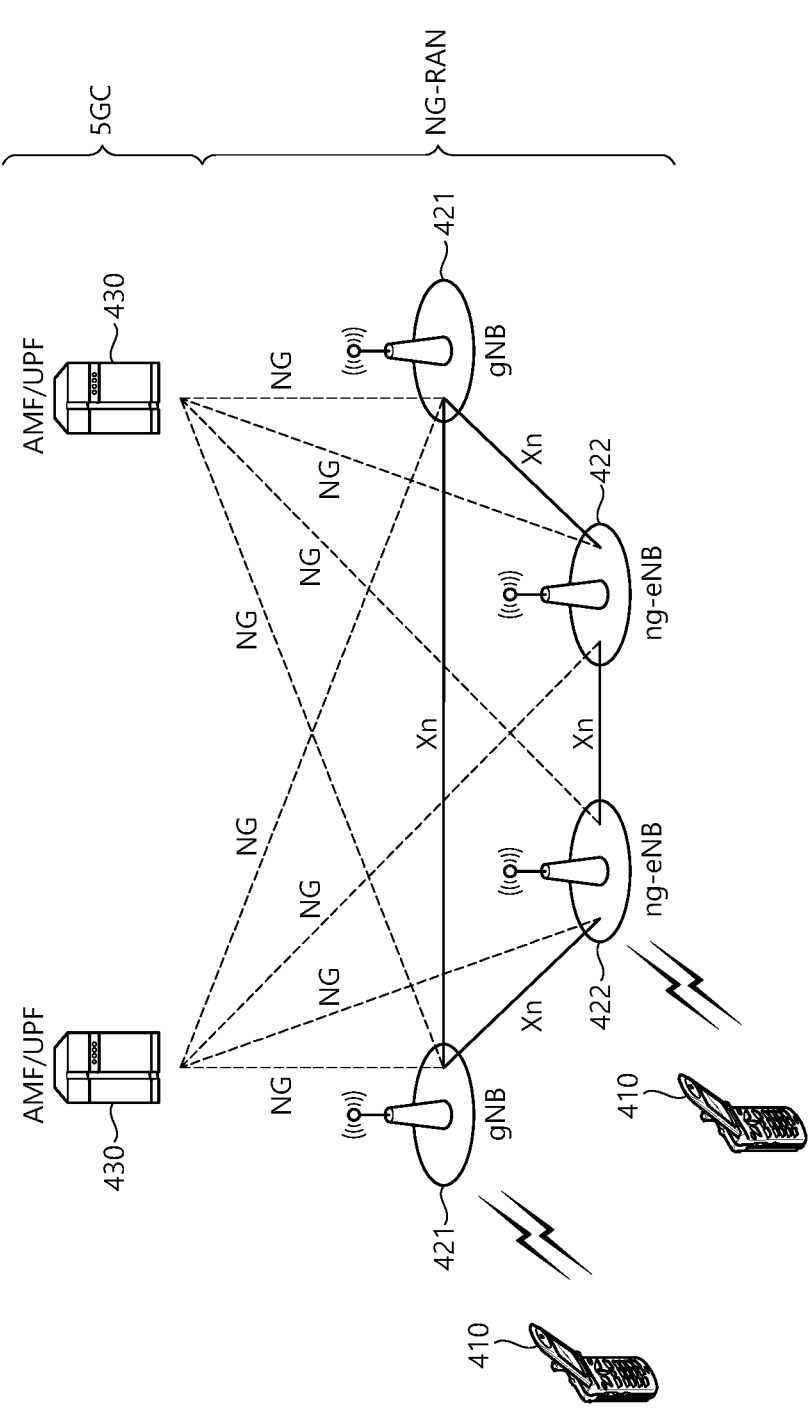
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 5:
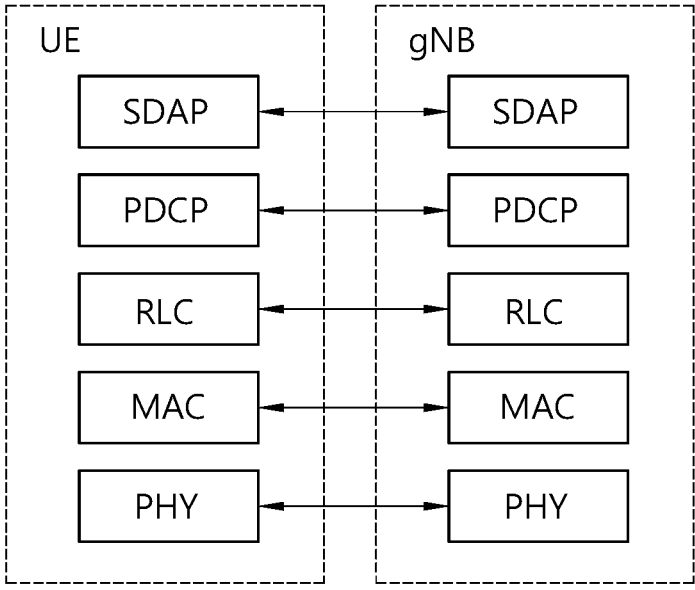
FIG. 5 shows a block diagram of a user plane protocol stack to which the technical features of the present disclosure can be applied.
Figure 6:
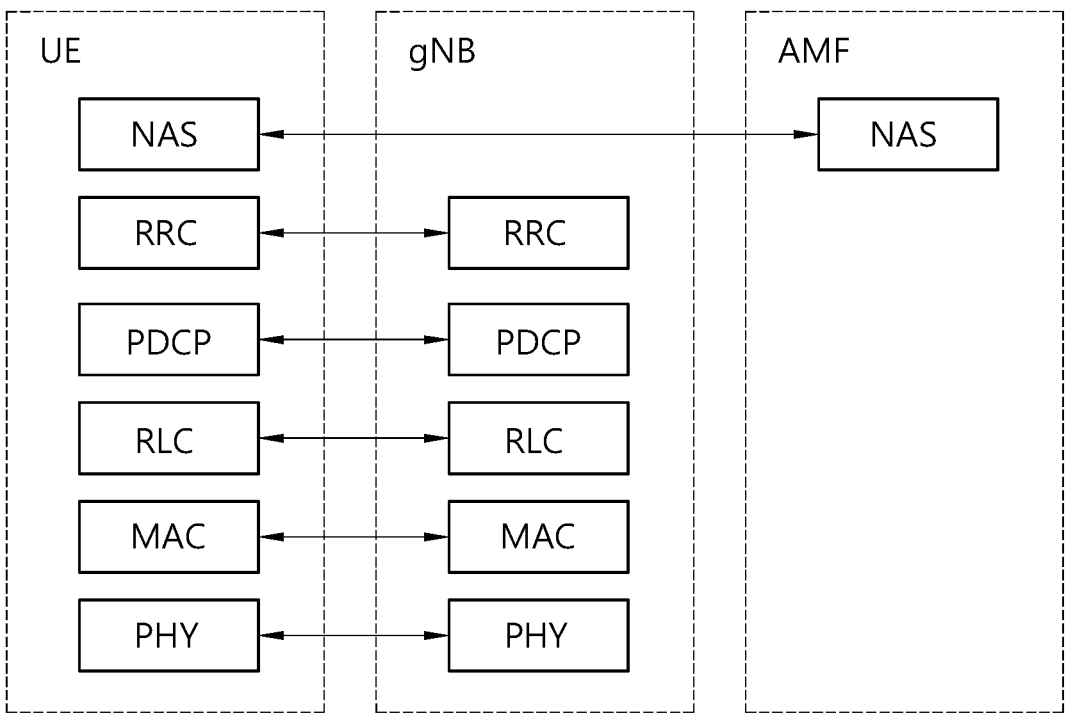
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Figure 7:
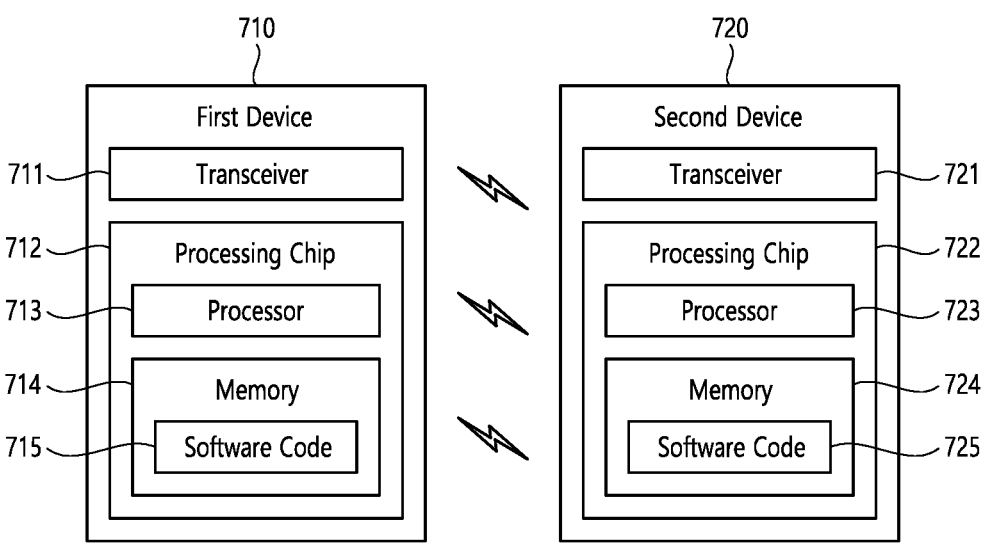
FIG. 7 shows another example of a wireless communication system to which the technical features of the present disclosure can be applied.

FIG. 7 shows another example of a wireless communication system to which the technical features of the present disclosure can be applied.

Referring to FIG. 7, wireless devices 710 and 720 may correspond to the wireless devices 210 and 220 of FIG. 2 and may be configured by various elements, components, units/portions, and/or modules.

The first wireless device 710 may include at least one transceiver, such as a transceiver 711, and at least one processing chip, such as a processing chip 712. The processing chip 712 may include at least one processor, such a processor 713, and at least one memory, such as a memory 714. The memory 714 may be operably connectable to the processor 713. The memory 714 may store various types of information and/or instructions. The memory 714 may store a software code 715 which implements instructions that, when executed by the processor 713, perform the descriptions, functions, procedures, suggestions, methods and/or operational flowcharts disclosed in the present disclosure. For example, the software code 715 may implement instructions that, when executed by the processor 713, perform the descriptions, functions, procedures, suggestions, methods and/or operational flowcharts disclosed in the present disclosure. For example, the software code 715 may control the processor 713 to perform one or more protocols. For example, the software code 715 may control the processor 713 may perform one or more layers of the radio interface protocol.

The second wireless device 720 may include at least one transceiver, such as a transceiver 721, and at least one processing chip, such as a processing chip 722. The processing chip 722 may include at least one processor, such a processor 723, and at least one memory, such as a memory 724. The memory 724 may be operably connectable to the processor 723. The memory 724 may store various types of information and/or instructions. The memory 724 may store a software code 725 which implements instructions that, when executed by the processor 723, perform the descriptions, functions, procedures, suggestions, methods and/or operational flowcharts disclosed in the present disclosure. For example, the software code 725 may implement instructions that, when executed by the processor 723, perform the descriptions, functions, procedures, suggestions, methods and/or operational flowcharts disclosed in the present disclosure. For example, the software code 725 may control the processor 723 to perform one or more protocols. For example, the software code 725 may control the processor 723 may perform one or more layers of the radio interface protocol.

Figure 8:
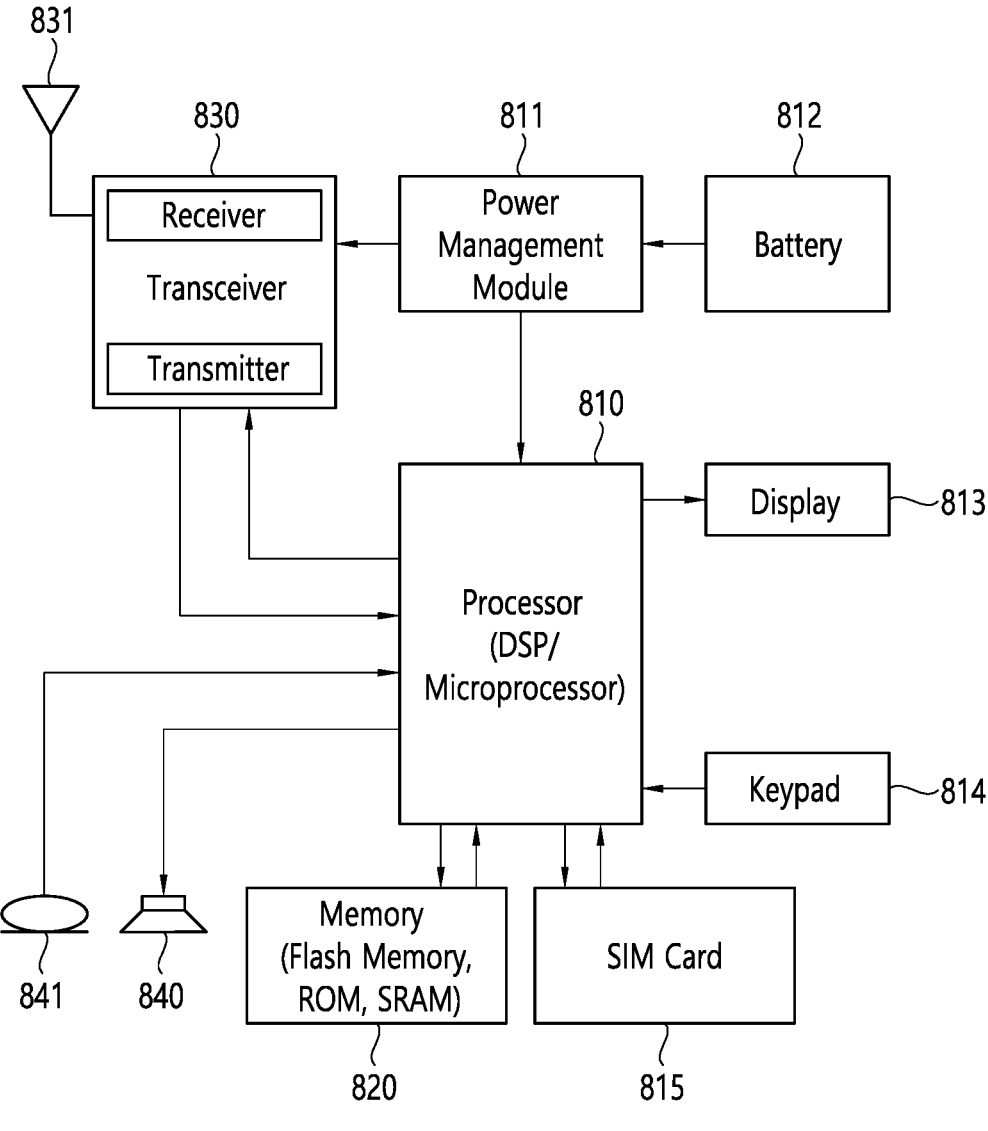
FIG. 8 shows a UE to which the technical features of the present disclosure can be applied.

FIG. 8 shows a UE to which the technical features of the present disclosure can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement the descriptions, functions, procedures, suggestions, methods and/or operational flowcharts disclosed in the present disclosure. The processor 810 may be configured to control one or more other components of the UE to implement descriptions, functions, procedures, suggestions, methods and/or operational flowcharts disclosed in the present disclosure. Layers of the radio interface protocol may be implemented in the processor 810. The processor 810 may include ASIC, other chipset, logic circuit and/or data processing device. The processor 810 may be an application processor. The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

Sidelink (SL) transmission and/or communication in 5G NR is described. Section 5.7 and Section 16.9 of 3GPP TS 38.300 V16.1.0 can be referred.

Sidelink transmission and reception over the PC5 interface are supported when the UE is inside NG-RAN coverage, irrespective of which RRC state the UE is in, and when the UE is outside NG-RAN coverage.

Support of V2X services via the PC5 interface can be provided by NR sidelink communication and/or V2X sidelink communication. NR sidelink communication may be used to support other services than V2X services.

NR sidelink communication can support one of three types of transmission modes for a pair of a Source Layer-2 ID and a Destination Layer-2 ID in the AS:

(1) Unicast transmission, characterized by:

Support of one PC5-RRC connection between peer UEs for the pair;

Transmission and reception of control information and user traffic between peer UEs in sidelink;

Support of sidelink HARQ feedback;

Support of RLC AM;

Detection of radio link failure for the PC5-RRC connection.

(2) Groupcast transmission, characterized by:

Transmission and reception of user traffic among UEs belonging to a group in sidelink;

Support of sidelink HARQ feedback.

(3) Broadcast transmission, characterized by:

Transmission and reception of user traffic among UEs in sidelink.

Radio protocol architecture for NR sidelink communication may be as follows.

The AS protocol stack for the control plane in the PC5 interface consists of RRC, PDCP, RLC and MAC sublayers, and the physical layer.

For support of PC5-S protocol, PC5-S is located on top of PDCP, RLC and MAC sublayers, and the physical layer for the control plane in the PC5 interface.

The AS protocol stack for SBCCH in the PC5 interface consists of RRC, RLC, MAC sublayers, and the physical layer.

The AS protocol stack for user plane in the PC5 interface consists of SDAP, PDCP, RLC and MAC sublayers, and the physical layer.

Sidelink Radio bearers (SLRB) are categorized into two groups: sidelink data radio bearers (SL DRB) for user plane data and sidelink signalling radio bearers (SL SRB) for control plane data. Separate SL SRBs using different SCCHs are configured for PC5-RRC and PC5-S signaling respectively.

Physical sidelink control channel (PSCCH) indicates resource and other transmission parameters used by a UE for PSSCH. PSCCH transmission is associated with a demodulation reference signal (DM-RS).

Physical sidelink shared channel (PSSCH) transmits the TBs of data themselves, and control information for HARQ procedures and channel state information (CSI) feedback triggers, etc. At least 5 OFDM symbols within a slot are used for PSSCH transmission. PSSCH transmission is associated with a DM-RS and may be associated with a phase tracking reference signal (PT-RS).

Physical sidelink feedback channel (PSFCH) carries HARQ feedback over the sidelink from a UE which is an intended recipient of a PSSCH transmission to the UE which performed the transmission. PSFCH sequence is transmitted in one PRB repeated over two OFDM symbols near the end of the sidelink resource in a slot.

The sidelink synchronization signal consists of sidelink primary and sidelink secondary synchronization signals (S-PSS, S-SSS), each occupying 2 symbols and 127 subcarriers. Physical sidelink broadcast channel (PSBCH) occupies 7 and 5 symbols for normal and extended cyclic prefix cases respectively, including the associated DM-RS.

Sidelink HARQ feedback uses PSFCH and can be operated in one of two options. In one option, PSFCH transmits either acknowledgement (ACK) or negative ACK (NACK) using a resource dedicated to a single PSFCH transmitting UE. In another option, PSFCH transmits NACK, or no PSFCH signal is transmitted, on a resource that can be shared by multiple PSFCH transmitting UEs.

In sidelink resource allocation mode 1, a UE which received PSFCH can report sidelink HARQ feedback to gNB via PUCCH or PUSCH.

For unicast, CSI reference signal (CSI-RS) is supported for CSI measurement and reporting in sidelink. A CSI report is carried in a MAC control element (CE).

The MAC sublayer provides the following services and functions over the PC5 interface in addition to the services and functions described above by referring to FIGS. 5 and 6.

Radio resource selection;

Packet filtering;

Priority handling between uplink and sidelink transmissions for a given UE;

Sidelink CSI reporting.

With logical channel prioritization (LCP) restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant type 1.

For packet filtering, a SL-SCH MAC header including portions of both Source Layer-2 ID and a Destination Layer-2 ID is added to each MAC PDU. Logical channel ID (LCID) included within a MAC subheader uniquely identifies a logical channel within the scope of the Source Layer-2 ID and Destination Layer-2 ID combination.

The following logical channels are used in sidelink:

Sidelink control channel (SCCH): a sidelink channel for transmitting control information from one UE to other UE(s);

Sidelink traffic channel (STCH): a sidelink channel for transmitting user information from one UE to other UE(s);

Sidelink broadcast control channel (SBCCH): a sidelink channel for broadcasting sidelink system information from one UE to other UE(s).

The following connections between logical channels and transport channels exist:

SCCH can be mapped to sidelink shared channel (SL-SCH);

STCH can be mapped to SL-SCH;

SBCCH can be mapped to sidelink broadcast channel (SL-BCH).

The RRC sublayer provides the following services and functions over the PC5 interface:

Transfer of a PC5-RRC message between peer UEs;

Maintenance and release of a PC5-RRC connection between two UEs;

Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established. There is one-to-one correspondence between the PC5-RRC connection and the PC5 unicast link. A UE may have multiple PC5-RRC connections with one or more UEs for different pairs of Source and Destination Layer-2 IDs.

Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions.

If it is not interested in sidelink transmission, if sidelink radio link failure (RLF) on the PC5-RRC connection is declared, or if the Layer-2 link release procedure is completed or if the T400 is expired, UE releases the PC5-RRC connection.

Two sidelink resource allocation modes are supported, i.e., mode 1 and mode 2. In mode 1, the sidelink resource allocation is provided by the network. In mode 2, UE decides the SL transmission resources and timing in the resource pool.

Mode 1, which may be called scheduled resource allocation, may be characterized by the following:

The UE needs to be RRC_CONNECTED in order to transmit data;

NG-RAN schedules transmission resources.

Mode 2, which may be called UE autonomous resource selection, may be characterized by the following:

The UE can transmit data when inside NG-RAN coverage, irrespective of which RRC state the UE is in, and when outside NG-RAN coverage;

The UE autonomously selects transmission resources from a pool of resources.

For NR sidelink communication, the UE performs sidelink transmissions only on a single carrier.

In mode 1, NG-RAN can dynamically allocate resources to the UE via the sidelink radio network temporary identifier (SL-RNTI) on PDCCH(s) for NR sidelink communication.

In addition, NG-RAN can allocate sidelink resources to UE with two types of configured sidelink grants:

With type 1, RRC directly provides the configured sidelink grant only for NR sidelink communication;

With type 2, RRC defines the periodicity of the configured sidelink grant while PDCCH can either signal and activate the configured sidelink grant, or deactivate it. The PDCCH is addressed to SL configured scheduling RNTI (SL-CS-RNTI) for NR sidelink communication and SL semi-persistent scheduling V-RNTI for V2X sidelink communication.

For the UE performing NR sidelink communication, there can be more than one configured sidelink grant activated at a time on the carrier configured for sidelink transmission When beam failure or physical layer problem occurs on NR Uu, the UE can continue using the configured sidelink grant type 1. During handover, the UE can be provided with configured sidelink grants via handover command, regardless of the type. If provided, the UE activates the configured sidelink grant type 1 upon reception of the handover command.

The UE can send sidelink buffer status report (SL BSR) to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

In mode 2, the UE autonomously selects sidelink grant from a pool of resources provided by broadcast system information or dedicated signalling while inside NG-RAN coverage or by pre-configuration while outside NG-RAN coverage.

For NR sidelink communication, the pools of resources can be provided for a given validity area where the UE does not need to acquire a new pool of resources while moving within the validity area, at least when this pool is provided by system information block (SIB) (e.g. reuse valid area of NR SIB). NR SIB validity mechanism is reused to enable validity area for SL resource pool configured via broadcasted system information.

The UE is allowed to temporarily use UE autonomous resource selection with random selection for sidelink transmission based on configuration of the exceptional transmission resource pool.

When a UE is inside NG-RAN coverage, NR sidelink communication and/or V2X sidelink communication can be configured and controlled by NG-RAN via dedicated signalling or system information:

The UE should support and be authorized to perform NR sidelink communication and/or V2X sidelink communication in NG-RAN;

If configured, the UE performs V2X sidelink communication unless otherwise specified;

NG-RAN can provide the UE with intra-carrier sidelink configuration, inter-carrier sidelink configuration and anchor carrier which provides sidelink configuration via a Uu carrier for NR sidelink communication and/or V2X Sidelink communication;

When the UE cannot simultaneously perform both NR sidelink transmission and NR uplink transmission in time domain, prioritization between both transmissions is done based on their priorities and thresholds configured by the NG-RAN.

When a UE is outside NG-RAN coverage, SLRB configuration are preconfigured to the UE for NR sidelink communication.

The UE in RRC_CONNECTED performs NR sidelink communication and/or V2X sidelink communication. The UE sends Sidelink UE Information to NG-RAN in order to request or release sidelink resources and report QoS information for each destination.

NG-RAN provides RRCReconfiguration to the UE in order to provide the UE with dedicated sidelink configuration. The RRCReconfiguration may include SLRB configuration for NR sidelink communication as well as either sidelink scheduling configuration or resource pool configuration. If UE has received SLRB configuration via system information, UE should continue using the configuration to perform sidelink data transmissions and receptions until a new configuration is received via the RRCReconfiguration.

NG-RAN may also configure measurement and reporting of channel busy ratio (CBR) and reporting of location information to the UE via RRCReconfiguration.

During handover, the UE performs sidelink transmission and reception based on configuration of the exceptional transmission resource pool or configured sidelink grant type 1 and reception resource pool of the target cell as provided in the handover command.

The UE in RRC_IDLE or RRC_INACTIVE performs NR sidelink communication and/or V2X sidelink communication. NG-RAN may provide common sidelink configuration to the UE in RRC_IDLE or RRC_INACTIVE via system information for NR sidelink communication and/or V2X sidelink communication. UE receives resource pool configuration and SLRB configuration via SIB 12 for NR sidelink communication, and/or resource pool configuration via SIB 13 and SIB 14 for V2X sidelink communication. If UE has received SLRB configuration via dedicated signalling, UE should continue using the configuration to perform sidelink data transmissions and receptions until a new configuration is received via system information.

When the UE performs cell reselection, the UE interested in V2X service(s) considers at least whether NR sidelink communication and/or V2X sidelink communication are supported by the cell. The UE may consider the following carrier frequency as the highest priority frequency, except for the carrier only providing the anchor carrier:

the frequency providing both NR sidelink communication and V2X sidelink communication, if configured to perform both NR sidelink communication and V2X sidelink communication;

the frequency providing NR sidelink communication, if configured to perform only NR sidelink communication.

A UE may reset MAC for Uu RRC connection (i.e., RRC connection between UE and BS) when one of the following cases occurs.

Upon request for on demand system information, if cell reselection occurs while waiting for the acknowledgment for system information request from lower layers; or T300 expiry; or Upon abortion of RRC connection establishment; or T304 expiry; or Upon initiation of the RRC connection re-establishment procedure; or Upon RRC connection release; or Upon going to RRC_IDLE; or Upon reception of the RRCReject by the UE; or Upon successful completion of the mobility from NR However, MAC reset for PC5-RRC connection (i.e., RRC connection between wireless device for sidelink) has not been specified yet. Thus, how the UE handles sidelink transmission upon MAC reset is not clear.

For example, the RX UE may establish PC5-RRC connection with the TX UE, and may obtain TB for the established PC5-RRC connection by performing soft combining of received data in soft buffers of sidelink process. Even if the PC5-RRC connection is released due to a number of reasons, the RX UE may continue maintaining the soft buffers unnecessarily.

According to implementations of the present disclosure, a UE may establish one or more PC5-RRC connections. A MAC layer of the UE (simply as UE MAC) may be equipped with multiple sidelink processes for receiving SL HARQ transmissions related to the one or more PC5-RRC connections. To obtain one TB, the UE MAC may perform soft combining of received data in soft buffers of one of the multiple sidelink processes.

According to implementations of the present disclosure, an RRC layer of the UE (simply as UE RRC) may request MAC reset for a specific PC5-RRC connection from among the one or more PC5-RRC connection. Upon request of the MAC reset for the specific PC5-RRC connection by the UE RRC, the UE MAC may cancel soft buffers of all sidelink processes for all TBs related to the specific PC5-RRC connection only.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 9 shows an example of a method performed by a first wireless device to which implementation of the present disclosure is applied.

In step S900, the method includes establishing one or more PC5-RRC connections.

In step S910, the method includes receiving, from a second wireless device, data for a TB associated to one PC5-RRC connection among the one or more PC5-RRC connections.

For example, for each PSSCH duration where a transmission takes place for the sidelink process, one TB and the associated HARQ information is received from the sidelink HARQ entity. For each received TB and associated sidelink transmission information, the sidelink process may:

1> if this is a new transmission:

2> attempt to decode the received data.

1> else if this is a retransmission:

2> if the data for this TB has not yet been successfully decoded:

3> instruct the physical layer to combine the received data with the data currently in the soft buffer for this TB and attempt to decode the combined data.

1> if the data which the MAC entity attempted to decode was successfully decoded for this TB; or 1> if the data for this TB was successfully decoded before:

2> if this is the first successful decoding of the data for this TB, if the SRC field of the decoded MAC PDU subheader is equal to the 16 MSB of any of the Source Layer-2 ID(s) of the UE for which the 8 LSB are equal to the Source ID in the corresponding SCI, and if the DST field of the decoded MAC PDU subheader is equal to the 8 MSB of any of the Destination Layer-2 ID(s) of the UE for which the 16 LSB are equal to the Destination ID in the corresponding SCI:

3> deliver the decoded MAC PDU to the disassembly and demultiplexing entity;

3> consider the Sidelink process as unoccupied.

1> else:

2> instruct the physical layer to replace the data in the soft buffer for this TB with the data which the MAC entity attempted to decode.

1> if HARQ feedback is enabled by the SCI that indicates a Zone id and a communication range:

2> if distance between UE's location and the central location of the Zone id is smaller or equal to the communication range:

3> instruct the physical layer to generate an acknowledgement of the data in this TB.

1> else if HARQ feedback is enabled by the SCI:

2> instruct the physical layer to generate an acknowledgement of the data in this TB.

In step S920, the method includes, based on a MAC reset being requested for the one PC5-RRC connection among the one or more PC5-RRC connection by an upper layer of the first wireless device, flushing soft buffers of all sidelink processes for all TBs associated to the one PC5-RRC connection. The all TBs includes the TB. That is, if MAC reset is requested by the upper layer (e.g., RRC layer) of the first wireless device for the one PC5-RRC connection, the MAC layer of the first wireless device may flush soft buffers of all sidelink processes for all TBs associated to the one PC5-RRC connection.

In some implementations, for a specific buffer included in the soft buffers, the method may further include instructing a lower layer of the first wireless device to combine the received data with data currently in the specific soft buffer of a sidelink process for the TB. The all sidelink processes may include the sidelink process.

In some implementations, the method may further include establishing a RRC connection with a base station. Even if the MAC reset is requested by the upper layer (e.g., RRC layer) of the first wireless device for the RRC connection, a buffer may not be flushed.

In some implementations, the one PC5-RRC connection may correspond to a destination of sidelink transmission.

In some implementations, the MAC reset for the one PC5-RRC connection may be requested based on releasing the one PC5-RRC connection.

In some implementations, the upper layer may be a RRC layer.

In some implementations, the first wireless device may be in communication with at least one of a mobile device, a network, and/or autonomous vehicles other than the first wireless device.

According to implementation of the present disclosure shown in FIG. 9, an example of operations of the MAC entity may be as follows.

For example, if a partial reset of the MAC entity for a PC5-RRC connection (or a PC5 unicast link or a destination ID or the pair of Source/Destination IDs for the corresponding cast-type) is requested by upper layers (e.g., UE RRC), and/or if a PC5-RRC connection (or a PC5 unicast link or a destination ID or the pair of Source/Destination IDs for the corresponding cast-type) is established, reconfigured and/or released, and/or if one or both of Source ID and Destination ID for a PC5-RRC connection (or a PC5 unicast link or a destination ID or the pair of Source/Destination IDs for the corresponding cast-type) are updated, the MAC entity may:

1> initialize SBj for each logical channel associated to the PC5-RRC connection (or a PC5 unicast link or a destination ID or the pair of Source/Destination IDs for the corresponding cast-type) to zero, the logical channel being SCCH used to carry PC5-S signaling and PC5-RRC signaling;

1> stop (if running) all timers associated to the PC5-RRC connection (or a PC5 unicast link or a destination ID or the pair of Source/Destination IDs for the corresponding cast-type);

1> flush the soft buffers for all sidelink processes for all TB(s) associated to the PC5-RRC connection (or a PC5 unicast link or a destination ID or the pair of Source/Destination IDs for the corresponding cast-type)

1> cancel, if any, triggered Scheduling Request procedure only associated to logical channel(s) and/or MAC CE(s) of the PC5-RRC connection (or a PC5 unicast link or a destination ID or the pair of Source/Destination IDs for the corresponding cast-type), the MAC CE being SL CSI Reporting MAC CE;

1> cancel, if any, triggered Sidelink Buffer Status Reporting procedure only associated to logical channel(s) of the PC5-RRC connection (or a PC5 unicast link or a destination ID or the pair of Source/Destination IDs for the corresponding cast-type);

1> for each Sidelink process, consider the next received transmission for a TB as the very first transmission;

1> release, if any, any RNTI (e.g. SL-RNTI or SLCS-RNTI) only associated to SL transmission of the PC5-RRC connection (or a PC5 unicast link or a destination ID or the pair of Source/Destination IDs for the corresponding cast-type).

For another example, if a sidelink specific reset of the MAC entity is requested for a PC5-RRC connection by upper layers, the MAC entity may:

1> flush the soft buffers for all sidelink processes for all TB(s) associated to the PC5-RRC connection;

1> consider all Sidelink processes for all TB(s) associated to the PC5-RRC connection as unoccupied;

1> cancel, if any, triggered Scheduling Request procedure only associated to the PC5-RRC connection;

1> cancel, if any, triggered Sidelink Buffer Status Reporting procedure only associated to the PC5-RRC connection;

1> cancel, if any, triggered Sidelink CSI Reporting procedure associated to the PC5-RRC connection;

1> stop (if running) all timers associated to the PC5-RRC connection;

1> reset the numConsecutiveDTX associated to the PC5-RRC connection;

1> initialize SBj for each logical channel associated to the PC5-RRC connection to zero.

Furthermore, the method in perspective of the first wireless device described above in FIG. 9 may be performed by the first device 210 shown in FIG. 2, the first wireless device 710 shown in FIG. 7, and/or the UE shown in FIG. 8.

More specifically, the first wireless device comprises at least one transceiver, at least one processor, and at least one computer memory operably connectable to the at least one processor and storing instructions that, based on being executed by the at least one processor, perform operations below.

The first wireless device establishes one or more PC5-RRC connections.

The first wireless device receive, from a second wireless device, data for a TB associated to one PC5-RRC connection among the one or more PC5-RRC connections.

The first wireless device, based on a MAC reset being requested for the one PC5-RRC connection among the one or more PC5-RRC connection by an upper layer of the first wireless device, flushes soft buffers of all sidelink processes for all TBs associated to the one PC5-RRC connection. The all TBs includes the TB. That is, if MAC reset is requested by the upper layer (e.g., RRC layer) of the first wireless device for the one PC5-RRC connection, the MAC layer of the first wireless device may flush soft buffers of all sidelink processes for all TBs associated to the one PC5-RRC connection.

In some implementations, for a specific buffer included in the soft buffers, the method may further include instructing a lower layer of the first wireless device to combine the received data with data currently in the specific soft buffer of a sidelink process for the TB. The all sidelink processes may include the sidelink process.

In some implementations, the method may further include establishing a RRC connection with a base station. Even if the MAC reset is requested by the upper layer (e.g., RRC layer) of the first wireless device for the RRC connection, a buffer may not be flushed.

In some implementations, the one PC5-RRC connection may correspond to a destination of sidelink transmission.

In some implementations, the MAC reset for the one PC5-RRC connection may be requested based on releasing the one PC5-RRC connection.

In some implementations, the upper layer may be a RRC layer.

Furthermore, the method in perspective of the first wireless device described above in FIG. 9 may be performed by control of the processor 211 included in the first device 210 shown in FIG. 2, by control of the processor 713 included in the first wireless device 710 shown in FIG. 7, and/or by control of the processor 810 included in the UE shown in FIG. 8.

More specifically, an apparatus operating in a wireless communication system (e.g., first wireless device) comprises at least one processor, and at least one computer memory operably connectable to the at least one processor. The at least one processor is configured to perform operations comprising: establishing one or more PC5-RRC connections, obtaining a TB associated to one PC5-RRC connection among the one or more PC5-RRC connections, and based on a MAC reset being requested for the one PC5-RRC connection by an upper layer, flushing soft buffers of all sidelink processes for all TBs associated to the one PC5-RRC connection, wherein the all TBs includes the TB.

Furthermore, the method in perspective of the first wireless device described above in FIG. 9 may be performed by a software code 715 stored in the memory 714 included in the first wireless device 710 shown in FIG. 7.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: establishing one or more PC5-RRC connections, obtaining a TB associated to one PC5-RRC connection among the one or more PC5-RRC connections, and based on a MAC reset being requested for the one PC5-RRC connection by an upper layer, flushing soft buffers of all sidelink processes for all TBs associated to the one PC5-RRC connection, wherein the all TBs includes the TB.

FIG. 10 shows an example of a method performed by a second wireless device to which implementation of the present disclosure is applied.

In step S1000, the method includes establishing one or more PC5-RRC connections.

In step S1010, the method includes transmitting, to a first wireless device, data for a TB associated to one PC5-RRC connection among the one or more PC5-RRC connections.

Soft buffers of all sidelink processes for all TBs associated to the one PC5-RRC connection are flushed based on a MAC reset being requested for the one PC5-RRC connection by an upper layer of the first wireless device. The all TBs includes the TB.

Furthermore, the method in perspective of the second wireless device described above in FIG. 10 may be performed by the second device 220 shown in FIG. 2, the second wireless device 720 shown in FIG. 7, and/or the UE shown in FIG. 8.

More specifically, the second wireless device comprises at least one transceiver, at least one processor, and at least one computer memory operably connectable to the at least one processor and storing instructions that, based on being executed by the at least one processor, perform operations below.

The second wireless device establishes one or more PC5-RRC connections.

The second wireless device transmits, to a first wireless device, data for a TB associated to one PC5-RRC connection among the one or more PC5-RRC connections.

Soft buffers of all sidelink processes for all TBs associated to the one PC5-RRC connection are flushed based on a MAC reset being requested for the one PC5-RRC connection by an upper layer of the first wireless device. The all TBs includes the TB.

Furthermore, the method in perspective of the second wireless device described above in FIG. 10 may be performed by control of the processor 221 included in the second device 220 shown in FIG. 2, by control of the processor 723 included in the second wireless device 720 shown in FIG. 7, and/or by control of the processor 810 included in the UE shown in FIG. 8.

More specifically, an apparatus operating in a wireless communication system (e.g., second wireless device) comprises at least one processor, and at least one computer memory operably connectable to the at least one processor. The at least one processor is configured to perform operations comprising: establishing one or more PC5-RRC connections, and generating a TB associated to one PC5-RRC connection among the one or more PC5-RRC connections, wherein soft buffers of all sidelink processes for all TBs associated to the one PC5-RRC connection are flushed based on a MAC reset being requested for the one PC5-RRC connection by an upper layer, and wherein the all TBs includes the TB.

Furthermore, the method in perspective of the second wireless device described above in FIG. 10 may be performed by a software code 725 stored in the memory 724 included in the second wireless device 720 shown in FIG. 7.

More specifically, at least one CRM stores instructions that, based on being executed by at least one processor, perform operations comprising: establishing one or more PC5-RRC connections, and generating a TB associated to one PC5-RRC connection among the one or more PC5-RRC connections, wherein soft buffers of all sidelink processes for all TBs associated to the one PC5-RRC connection are flushed based on a MAC reset being requested for the one PC5-RRC connection by an upper layer, and wherein the all TBs includes the TB.

Figure 11:
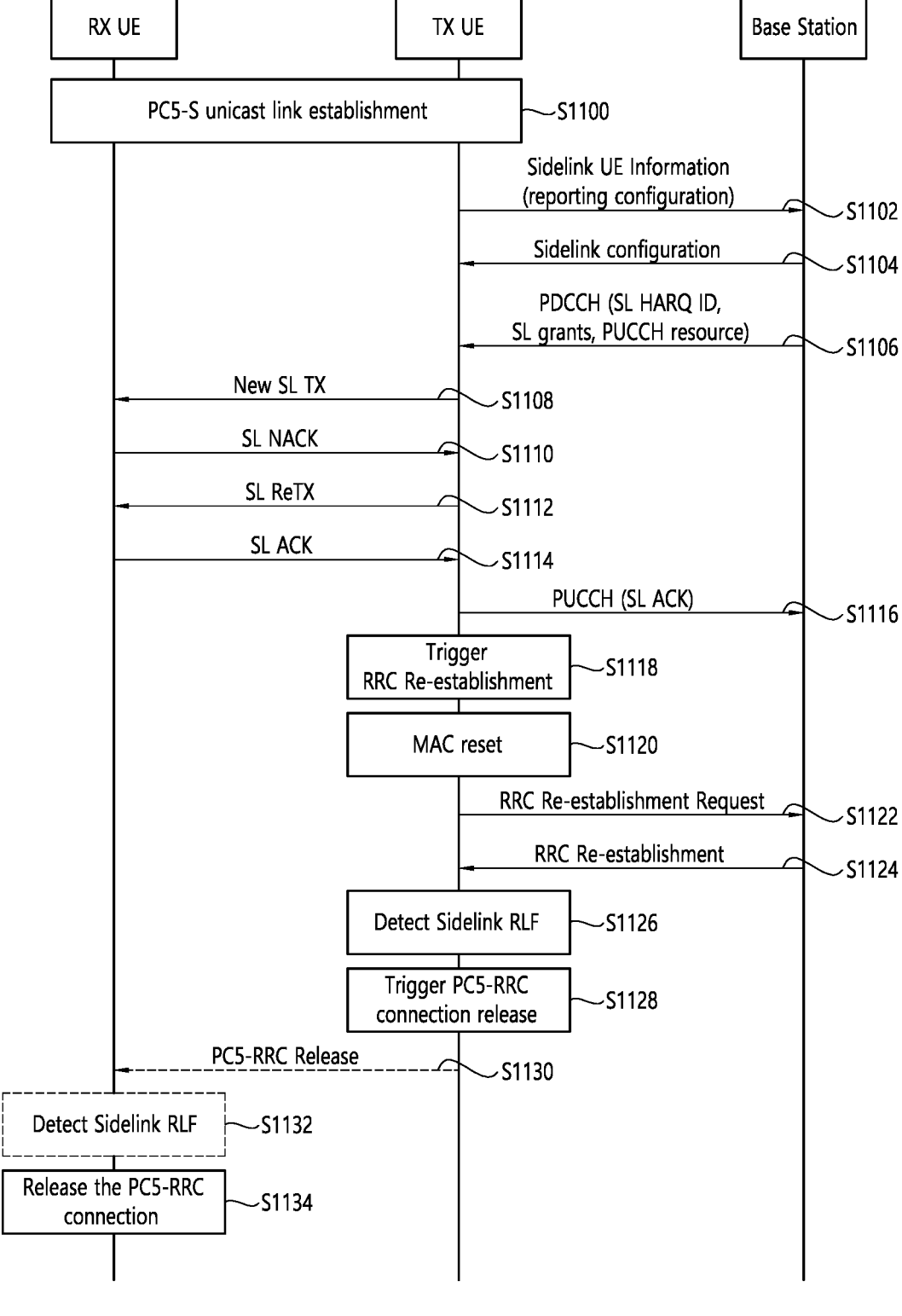
FIG. 11 shows an example of MAC reset operation to which implementation of the present disclosure is applied.

FIG. 11 shows an example of MAC reset operation to which implementation of the present disclosure is applied.

For the sake of convenience, FIG. 11 exemplarily describes MAC reset operation for sidelink data transmission. The present disclosure is not limited thereto, and may be applied to quality reporting for uplink data transmission as well.

In step S1100, the TX UE establishes a PC5-S unicast link and the associated PC5-RRC connection with the RX UE.

In some implementations, the TX UE may transmit a PC5-S signaling over SCCH to establish a PC5 unicast link and the associated PC5-RRC connection.

In step S1102, the TX UE sends Sidelink UE information indicating the destination ID of the RX UE to the network.

In step S1104, the TX UE is configured with sidelink transmissions and receptions for the PC5-RRC connection.

In step S1106, upon establishment of the PC5 unicast link and the PC5-RRC connection, the TX UE receives PDCCH indicating SL grant with a new data indicator (NDI) and a HARQ process ID.

In some implementations, the PDCCH may be addressed to SL-RNTI or SLCS-RNTI.

In some implementations, the PDCCH may indicate SL HARQ process ID, SL resource and/or PUCCH resource for SL HARQ (re-)transmissions.

In step S1108, the TX UE performs new SL transmission of a MAC PDU with the SL grant for the sidelink process associated to the HARQ process ID for the PC5-RRC connection.

In some implementations, the MAC PDU may carry SL data from one or more logical channels such as SCCH(s) and STCH(s).

In step S1110, the TX UE receives SL negative acknowledgement (NACK) for the PC5-RRC connection in response to the SL transmission of the MAC PDU.

In step S1112, the TX UE performs SL retransmission of the MAC PDU for the PC5-RRC connection.

In step S1114, the TX UE receives SL acknowledgement (ACK) for the PC5-RRC connection in response to the SL retransmission of the MAC PDU.

In step S1116, the TX UE forwards the received SL ACK to the base station by using the PUCCH resource for SL HARQ transmissions.

In some implementations, upon MAC reset triggered by Uu procedure, the TX UE may set the NDI for the HARQ process ID to the value 0 to receive the PDCCH. The Uu procedure may include at least one of SI request, RRC establishment, RRC reconfiguration with sync, RRC release and/or RRC re-establishment.

For example, in step S1118, the TX UE detects Uu RLF and triggers RRC re-establishment procedure. In step S1120, upon triggering the RRC re-establishment procedure, the TX UE performs MAC reset. If a reset of the MAC entity is requested by upper layers, the MAC entity shall:

1> initialize Bj for each logical channel to zero;

1> stop (if running) all timers;

1> consider all timeAlignmentTimers as expired;

1> set the NDIs for all uplink HARQ processes to the value 0;

1> set the NDIs for all HARQ process IDs to the value 0 to receive the PDCCH for the MAC entity's SL-RNTI and SLCS-RNTI;

1> stop, if any, ongoing RACH procedure;

1> discard explicitly signalled contention-free Random Access Resources, if any;

1> flush Msg3 buffer;

1> cancel, if any, triggered Scheduling Request procedure;

1> cancel, if any, triggered Buffer Status Reporting procedure;

1> cancel, if any, triggered Power Headroom Reporting procedure;

1> cancel, if any, triggered Sidelink Buffer Status Reporting procedure;

1> cancel, if any, triggered configured sidelink grant confirmation;

1> flush the soft buffers for all DL HARQ processes;

1> for each DL HARQ process, consider the next received transmission for a TB as the very first transmission;

1> release, if any, Temporary C-RNTI;

1> set BFI_COUNTER.

1> release PUCCH configuration for sidelink HARQ ACK.

In step S1122, the TX UE transmits a RRC re-establishment request message to the base station. In step 1124, the TX UE receives a RRC re-establishment message from the base station in response to the RRC re-establishment request message.

In some implementations, upon MAC reset triggered by PC5-RRC procedure, the TX UE initialize SBj for each logical channel associated to the PC5-RRC connection to zero, and flush SL buffer of the Sidelink processes associated to the PC5-RRC connection, and sets the NDI for the Sidelink process IDs associated to the PC5-RRC connection to the value 0. The PC5-RRC procedure may include at least one of Sidelink radio link failure (RLF), PC5 RRC reconfiguration sidelink, PC5 UE capability exchange and/or PC5 RRC release.

For example, in step S1126, the TX UE detects SL RLF. In step S1128, the TX UE triggers PC5-RRC connection release to upper layers. Or, the TX UE may detect inactivity timer expiry and trigger PC5-RRC connection release to upper layers.

In step S1130, the TX UE may send PC5-RRC release message to the RX UE.

In step S1132, the RX UE may also detect SL RLF or receive the PC5-RRC release message. Thus, in steep 51134, both UEs will release the PC5-RRC connection for which UE performs partial MAC reset for the PC5-RRC connection.

If a partial reset of the MAC entity for a PC5-RRC connection (or a PC5 unicast link or a destination ID or the pair of Source/Destination IDs for the corresponding cast-type) is requested by upper layers, and/or if a PC5-RRC connection (or a PC5 unicast link or a destination ID or the pair of Source/Destination IDs for the corresponding cast-type) is established, reconfigured or released, and/or if one or both of Source ID and Destination ID for a PC5-RRC connection (or a PC5 unicast link or a destination ID or the pair of Source/Destination IDs for the corresponding cast-type) are updated, the MAC entity may:

1> initialize SBj for each logical channel associated to the PC5-RRC connection (or a PC5 unicast link or a destination ID or the pair of Source/Destination IDs for the corresponding cast-type) to zero, the logical channel being SCCH used to carry PC5-S signalling and PC5-RRC signaling;

1> stop (if running) all timers associated to the PC5-RRC connection (or a PC5 unicast link or a destination ID or the pair of Source/Destination IDs for the corresponding cast-type);

1> flush the soft buffers for all sidelink processes for all TB(s) associated to the PC5-RRC connection (or a PC5 unicast link or a destination ID or the pair of Source/Destination IDs for the corresponding cast-type);

1> cancel, if any, triggered Scheduling Request procedure only associated to logical channel(s) and/or MAC CE(s) of the PC5-RRC connection (or a PC5 unicast link or a destination ID or the pair of Source/Destination IDs for the corresponding cast-type), the MAC CE being SL CSI Reporting MAC CE;

1> cancel, if any, triggered Sidelink Buffer Status Reporting procedure only associated to logical channel(s) of the PC5-RRC connection (or a PC5 unicast link or a destination ID or the pair of Source/Destination IDs for the corresponding cast-type);

1> for each Sidelink process, consider the next received transmission for a TB as the very first transmission;

1> release, if any, any RNTI (e.g. SL-RNTI or SLCS-RNTI) only associated to SL transmission of the PC5-

RRC connection (or a PC5 unicast link or a destination ID or the pair of Source/Destination IDs for the corresponding cast-type).

1> release, if any, PUCCH configuration only associated to SL transmission of the PC5-RRC connection (or a PC5 unicast link or a destination ID or the pair of Source/Destination IDs for the corresponding cast-type).

The present disclosure can have various advantageous effects.

For example, when MAC reset for a specific PC5-RRC connection occurs, maintaining soft buffers unnecessarily can be prevented so as to receive other sidelink transmissions.

For example, a UE performing SL transmission can properly reset MAC, in particular when UE detects link failure on Uu interface or PC5 interface.

For example, the system can properly handle MAC reset for a UE performing SL transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
establishing, by a first wireless device, a radio resource control (RRC) connection with a base station;
establishing, by the first wireless device, one or more PC5-RRC connections with one or more wireless devices,
wherein one PC5-RRC connection from among the one or more PC5-RRC connections is established between the first wireless device and a second wireless device, and
wherein the one PC5-RRC connection between the first wireless device and the second wireless device is related to a pair of a source and a destination;
receiving, by the first wireless device, data for a transport block (TB) from the second wireless device;
for a first sidelink process, combining, by the first wireless device, the received data with data currently in a soft buffer and attempting, by the first wireless device, to decode the combined data;
receiving, by the first wireless device, a request of a sidelink specific media access control (MAC) reset for the one PC5-RRC connection from an upper layer of the first wireless device; and
based on the sidelink specific MAC reset for the one PC5-RRC connection, flushing, by the first wireless device, soft buffers of all sidelink processes for all TBs associated to the one PC5-RRC connection.

2. The method of claim 1, wherein the all sidelink processes for the all TBs associated to the one PC5-RRC connection includes the first sidelink process.

3. The method of claim 1, wherein a soft buffer of the all sidelink processes for the all TBs associated to the one PC5-RRC connection is not flushed based on a MAC reset being requested for the RRC connection by the upper layer of the first wireless device.

4. The method of claim 1, wherein the sidelink specific MAC reset for the one PC5-RRC connection is requested based on releasing the one PC5-RRC connection.

5. The method of claim 1, wherein the upper layer of the first wireless device is an RRC layer.

6. The method of claim 1, wherein the first wireless device is in communication with at least one of a mobile device, a network, and/or autonomous vehicles other than the first wireless device.

7. A first wireless device comprising:
at least one transceiver;
at least one processor; and
at least one memory operably connectable to the at least one processor and storing instructions that, based on being executed by the at least one processor, perform operations comprising:
establishing a radio resource control (RRC) connection with a base station;
establishing one or more PC5-RRC connections with one or more wireless devices,
wherein one PC5-RRC connection from among the one or more PC5-RRC connections is established between the first wireless device and a second wireless device, and
wherein the one PC5-RRC connection between the first wireless device and the second wireless device is related to a pair of a source and a destination;
receiving, via the at least one transceiver, data for a transport block (TB) from the second wireless device;
for a first sidelink process, combining the received data with data currently in a soft buffer and attempting to decode the combined data;
receiving, via the at least one transceiver, a request of a sidelink specific media access control (MAC) reset for the one PC5-RRC connection from an upper layer of the first wireless device; and
based on the sidelink specific MAC reset for the one PC5-RRC connection, flushing soft buffers of all sidelink processes for all TBs associated to the one PC5-RRC connection.

8. The first wireless device of claim 7, wherein the all sidelink processes for the all TBs associated to the one PC5-RRC connection includes the first sidelink process.

9. The first wireless device of claim 7, wherein a soft buffer of the all sidelink processes for the all TBs associated to the one PC5-RRC connection is not flushed based on a MAC reset being requested for the RRC connection by the upper layer of the first wireless device.

10. A processing apparatus comprising:
at least one processor; and
at least one memory operably connectable to the at least one processor, wherein the at least one processor is configured to perform operations comprising:
establishing a radio resource control (RRC) connection;
establishing one or more PC5-RRC connections including one PC5-RRC connection, wherein the one PC5-RRC connection is established between a first wireless device and a second wireless device which is related to a pair of a source and a destination;

obtaining data for a transport block (TB);

for a first sidelink process, combining the obtained data with data currently in a soft buffer and attempting to decode the combined data;

obtaining a request of a sidelink specific media access control (MAC) reset for the one PC5-RRC connection from an upper layer of the first wireless device; and based on the sidelink specific MAC reset for the one PC5-RRC connection, flushing soft buffers of all sidelink processes for all TBs associated to the one PC5-RRC connection.

* * * * *